United States Patent
Wright et al.

(10) Patent No.: US 12,248,539 B2
(45) Date of Patent: *Mar. 11, 2025

(54) METHOD AND SYSTEM FOR SECURING COMPUTER SOFTWARE USING A DISTRIBUTED HASH TABLE AND A BLOCKCHAIN

(71) Applicant: nChain Holdings Limited, St. John's (AG)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,532

(22) Filed: Aug. 13, 2021

(65) Prior Publication Data

US 2021/0374214 A1     Dec. 2, 2021

Related U.S. Application Data

(63) Continuation of application No. 16/079,074, filed as application No. PCT/IB2017/050827 on Feb. 14, 2017, now Pat. No. 11,455,378.

(30) Foreign Application Priority Data

Feb. 23, 2016  (GB) ...................................... 1603125
Apr. 22, 2016  (GB) ...................................... 1607058

(51) Int. Cl.
    *G06F 21/10*     (2013.01)
    *G06F 21/12*     (2013.01)
    (Continued)

(52) U.S. Cl.
    CPC .............. *G06F 21/12* (2013.01); *G06F 21/10* (2013.01); *G06Q 20/123* (2013.01);
    (Continued)

(58) Field of Classification Search
    CPC .. G06F 21/12; G06Q 20/123; G06Q 20/1235; G06Q 20/3823; G06Q 20/3825;
    (Continued)

(56) References Cited

U.S. PATENT DOCUMENTS 5,535,276 A    7/1996  Ganesan
5,600,725 A    2/1997  Rueppel et al.
(Continued)

FOREIGN PATENT DOCUMENTS

AU    2016100059 A4    3/2016
CA       2867765 A1    4/2016
(Continued)

OTHER PUBLICATIONS

Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.
(Continued)

*Primary Examiner* — Shin-Hon (Eric) Chen
*Assistant Examiner* — Vladimir I Gavrilenko
(74) *Attorney, Agent, or Firm* — Tarolli, Sundheim, Covell & Tummino LLP

(57) ABSTRACT

A computer-implemented method (100) and system (1) for determining a metadata M for securing a controlled digital resource such as computer software using a distributed hash table (13) and a peer-to-peer distributed ledger (14). This is a blockchain such as the Bitcoin blockchain. The method includes determining (110) a data associated with the computer software and determining (120) a first hash value based on the computer software. A second hash value based on the data and the computer software may be determined (130). The method further includes sending 140, over a communications network (5), the data, the first hash value and the second hash value to an entry for storage in a
(Continued)

distributed hash table (13). The second hash value may be a key of a key-value pair. The data and the first hash value may be a value in the key-value pair. A metadata (M) that is based on the second hash value may be determined (150) for storage on the peer-to-peer distributed ledger (14).

12 Claims, 6 Drawing Sheets

(51) Int. Cl.
    *G06Q 20/12* (2012.01)
    *G06Q 20/38* (2012.01)
    *H04L 9/06* (2006.01)
    *H04L 9/32* (2006.01)
    *H04L 9/00* (2022.01)

(52) U.S. Cl.
    CPC ..... *G06Q 20/1235* (2013.01); *G06Q 20/3823* (2013.01); *G06Q 20/3825* (2013.01); *G06Q 20/3827* (2013.01); *G06Q 20/3829* (2013.01); *H04L 9/0637* (2013.01); *H04L 9/0643* (2013.01); *H04L 9/3213* (2013.01); *H04L 9/3236* (2013.01); *H04L 9/3247* (2013.01); *H04L 9/3252* (2013.01); *G06Q 2220/00* (2013.01); *H04L 9/50* (2022.05); *H04L 2209/56* (2013.01)

(58) Field of Classification Search
    CPC ........... G06Q 20/3827; G06Q 20/3829; G06Q 2220/00; H04L 9/0637; H04L 9/0643; H04L 9/3213; H04L 9/3236; H04L 9/3247; H04L 9/03; H04L 9/252; H04L 9/50; H04L 2209/56
    See application file for complete search history.

(56) References Cited

U.S. PATENT DOCUMENTS

| | | |
|---|---|---|
| 5,761,305 A | 6/1998 | Vanstone et al. |
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 * | 5/2018 | Murphy ................ H04L 51/212 |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 11,188,907 B1 | 11/2021 | Vijayvergia et al. |
| 11,372,455 B2 | 6/2022 | Gauthier, Jr. |
| 11,455,378 B2 * | 9/2022 | Wright ................. H04L 9/0643 |
| 11,663,609 B2 | 5/2023 | Christidis et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Hikosaka et al. |
| 2004/0193890 A1 | 9/2004 | Girault |
| 2004/0252831 A1 | 12/2004 | Uehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153368 A1 | 7/2006 | Beeson |
| 2006/0156013 A1 | 7/2006 | Beeson |
| 2006/0161485 A1 | 7/2006 | Meldahl |
| 2006/0173788 A1 | 8/2006 | Nath Pandya et al. |
| 2006/0179319 A1 | 8/2006 | Krawczyk |
| 2006/0242038 A1 | 10/2006 | Giudilli |
| 2006/0248114 A1 | 11/2006 | Anderson et al. |
| 2007/0055880 A1 | 3/2007 | Lauter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0195499 A1 | 8/2008 | Meredith et al. |
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1 | 11/2009 | Rose et al. |
| 2010/0005302 A1 | 1/2010 | Vishnu et al. |
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |

(56) References Cited

U.S. PATENT DOCUMENTS

| | | |
|---|---|---|
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |
| 2011/0208970 A1 | 8/2011 | Brown et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0046792 A1 | 2/2014 | Ganesan |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0188719 A1 | 7/2014 | Poornachandran et al. |
| 2014/0195425 A1 | 7/2014 | Campos et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0379510 A1 | 12/2015 | Smith |
| 2015/0381729 A1 | 12/2015 | Manohar et al. |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1* | 6/2016 | Feeney ................. H04L 9/3236 705/71 |
| 2016/0203522 A1 | 7/2016 | Shiffert et al. |
| 2016/0203572 A1 | 7/2016 | McConaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342984 A1 | 11/2016 | Thomas et al. |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1 | 2/2017 | Haldenby et al. |
| 2017/0046698 A1 | 2/2017 | Haldenby et al. |
| 2017/0046792 A1 | 2/2017 | Haldenby et al. |
| 2017/0046806 A1 | 2/2017 | Haldenby et al. |

(56) References Cited

U.S. PATENT DOCUMENTS

| | | |
|---|---|---|
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |
| 2017/0103385 A1 | 4/2017 | Wilson, Jr. et al. |
| 2017/0109540 A1 | 4/2017 | Heiman et al. |
| 2017/0116608 A1 | 4/2017 | Forzley et al. |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0154391 A1 | 6/2017 | Watkins et al. |
| 2017/0169403 A1 | 6/2017 | Zhang |
| 2017/0178237 A1 | 6/2017 | Wong |
| 2017/0178263 A1 | 6/2017 | Kraemer et al. |
| 2017/0185527 A1* | 6/2017 | Ueda ............... G06F 12/1018 |
| 2017/0187535 A1 | 6/2017 | Middleton et al. |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0243214 A1 | 8/2017 | Johnsrud et al. |
| 2017/0250801 A1 | 8/2017 | Chen et al. |
| 2017/0300877 A1 | 10/2017 | Mann et al. |
| 2017/0308580 A1 | 10/2017 | Naganuma et al. |
| 2017/0316390 A1 | 11/2017 | Smith et al. |
| 2017/0324663 A1* | 11/2017 | Menase ............... H04L 45/7453 |
| 2017/0324715 A1 | 11/2017 | Frincu et al. |
| 2018/0025670 A1 | 1/2018 | Ikarashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0131512 A1 | 5/2018 | Gajek |
| 2018/0146367 A1 | 5/2018 | Altin et al. |
| 2018/0176017 A1* | 6/2018 | Rodriguez ............... H04L 63/20 |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0285840 A1 | 10/2018 | Hasan |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0266132 A1 | 8/2019 | Rubenstein |
| 2019/0305863 A1 | 10/2019 | Fayyad |
| 2019/0340352 A1 | 11/2019 | Peeters et al. |
| 2019/0349733 A1 | 11/2019 | Nolan et al. |
| 2019/0378139 A1 | 12/2019 | Stribady et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1* | 8/2020 | Padmanabhan ......... G06F 16/27 |
| 2020/0285935 A1 | 9/2020 | Song et al. |
| 2021/0056070 A1 | 2/2021 | Kakavand et al. |
| 2021/0194677 A1 | 6/2021 | Pourzandi et al. |
| 2021/0409489 A1* | 12/2021 | Speasl ............... H04L 67/108 |

FOREIGN PATENT DOCUMENTS

| | | |
|---|---|---|
| CN | 1262007 A | 8/2000 |
| CN | 101447980 A | 6/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104620535 A | 5/2015 |
| CN | 104704504 A | 6/2015 |
| CN | 105204802 A | 12/2015 |
| CN | 105306194 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001195479 A | 7/2001 |
| JP | 2002026895 A | 1/2002 |
| JP | 2004192587 A | 7/2004 |
| JP | 2004246882 A | 9/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2014068140 A | 4/2014 |
| JP | 2014153583 A | 8/2014 |
| JP | 2015536617 A | 12/2015 |
| JP | 5858506 B1 | 2/2016 |
| JP | 5858507 B1 | 2/2016 |
| JP | 2019512909 A | 5/2019 |
| KR | 20110012085 A | 2/2011 |
| KR | 101544722 B1 | 8/2015 |
| KR | 101579232 B1 | 1/2016 |
| KR | 20160009716 A | 1/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2015194798 A1 | 12/2015 |
| WO | 2016022864 A2 | 2/2016 |
| WO | 2016137360 A2 | 9/2016 |
| WO | 2016137499 A1 | 9/2016 |

(56) References Cited

FOREIGN PATENT DOCUMENTS

| WO | 2016161073 A1 | 10/2016 |
|---|---|---|
| WO | 2017006134 A1 | 1/2017 |
| WO | 2017112664 A1 | 6/2017 |

OTHER PUBLICATIONS

Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zyskind et al., "Decentralizing Privacy: Using a Blockchain to Protect Personal Data," 2015 IEEE CS Security and Privacy Workshops, May 21, 2015, 5 pages.
Zyskind et al., "Enigma: Decentralized Computation Platform with Guaranteed Privacy," arXiv preprint arXiv:1506, Jun. 10, 2015, 14 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users. For services that can share the excitement of competitions around the world," NTT Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_RETURN data TxOut as standard transaction type. #2738," Github, Jun. 4, 2013, https://github.com/bitcoin/bitcoin/pull/2738, 12 pages.
Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitcoin Stats," retrieved from http://bitcoinstats.com/irc/bitcoin-dev/logs/2015/03/27, Mar. 27, 2015, 11 pages.
Anonymous, "Bitsquare—The decentralised bitcoin exchange," Bitsquare.io, Jan. 3, 2016, 14 pages.
Anonymous, "Homepage," website operational as of 2017 [retrieved Nov. 30, 2020], https://www.coinffeine.com/, 2 pages.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Australian Office Action for Application No. 2017223158, mailed Jun. 22, 2021, 7 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitfreak! et al, "Understanding Stealth Addresses/Payments," Bitcoin Forum, Jun. 10, 2015 (retrieved Jun. 16, 2020), https://bitcointalk.org/index.php?topic=1086498.0, 8 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
BLOCK_CHAN, "Tweet dated Nov. 7, 2018," Twitter, Nov. 7, 2018, https://twitter.com/block_chan/status/1060336404163584000, 1 page.
Bluematt, http://bitcoinstats.com/irc/bitcoin-dev/logs/2015/03/16.
Bradbury, "Developers Battle Over Bitcoin Block Chain," Coindesk, http://www.coindesk.com/developers-battle-bitcoin-block-chain/, Mar. 25, 2014, 3 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Burgess et al., "The Promise of Bitcoin and the Blockchain," Consumers' Research, Jul. 13, 2015, 97 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_RETURN explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative CHECKLOCKTIMEVERIFY (was CLTV proposal)," Linux Foundation, https:/lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.

(56) References Cited

OTHER PUBLICATIONS

Countyparty, "The Counterparty Protocol," retrieved from https://github.com/jsimnz/Counterparty/blob/master/README.md, Jan. 8, 2014, 6 pages.

crpit.com, FYJC Mumbai 11th Online Admission 2021—Part-1, 2 Admission Form (mumbai.11thadmission.Org.in), https://crpit.com, Jul. 6, 2021 8 pages.

Danda et al., "hd-wallet-addrs," GitHub, https://github.com/dan-da/hd-wallet-addrs, Dec. 30, 2015 [retrieved Mar. 11, 2016], 7 pages.

Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.

Danda, "Help / FAQ," MyBitPrices, https://mybitprices.info/hd-wallet-addrs.html, Jan. 1, 2016 [retrieved Mar. 11, 2016], 4 pages.

Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.

Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.

Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.

Dixon, "True peer-to-peer currency exchange?," DGC Magazine, Jul. 2, 2013 [retrieved May 12, 2020], http://dgcmagazine.com/true-peer-to-peer-currency-exchange/, 6 pages.

Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.

DRCODE, "New Kid on the Blockchain," Hacker News, https://news.ycombinator.com/item?id=11372455, Mar. 28, 2016 [Dec. 12, 2018], 32 pages.

Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.

Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2l9l/time_to_lobby_bitcoins_core_devs_sf_bitcoin_devs/, Mar. 14, 2015 [Dec. 12, 2018], 21 pages.

Ethereum, "EIP-20: Token Standard," retrieved from https://eips.ethereum.org/EIPS/eip-20, Nov. 19, 2015, 5 pages.

European Communication pursuant to Article 94(3) EPC mailed Jan. 2, 2020, Patent Application No. 18166910.2-1218, filed Feb. 16, 2017, 4 pages.

European Communication pursuant to Article 94(3) EPC mailed Jul. 1, 2019, Application No. 17707121.4-1218, filed Feb. 14, 2017, 6 pages.

Extended European Search Report mailed Jul. 18, 2018, Patent Application No. 18166910.2-1218, filed Feb. 16, 2017, 8 pages.

Familiar et al., "Transcript for #bitcoin-dev 2015/03/27," BitcoinStats, http://bitcoinstats.com/irc/bitcoin-dev/ogs/2015/03/27, Mar. 27, 2015 [archived version Jun. 27, 2016], 11 pages.

Third-Party Submission Under 37 CFR 1.290 mailed Jun. 12, 2019, U.S. Appl. No. 16/079,089, filed Aug. 22, 2018, 19 pages.

Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.

Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.

Tuesta et al., "Smart contracts: the ultimate automation of trust?," BBVA Research Financial Inclusion Unit, Oct. 2015, 5 pages.

UK Commercial Search Report mailed Apr. 25, 2016, Patent Application No. 11603117.1, filed Feb. 23, 2016, 11 pages.

UK Commercial Search Report mailed Feb. 17, 2017, Patent Application No. 1604493.5, 8 pages.

UK Commercial Search Report mailed Jan. 13, 2017, Patent Application No. 1604498.4, 8 pages.

UK Commercial Search Report mailed Jun. 14, 2016, Patent Application No. 1607249.8, 4 pages.

UK Commercial Search Report mailed Jun. 27, 2016, Patent Application No. GB1603123.9, filed Feb. 23, 2016, 11 pages.

UK Commercial Search Report mailed Jun. 27, 2016, Patent Application No. GB1603125.4, 11 pages.

UK Commercial Search Report mailed Jun. 27, 2016, Patent Application No. GB1603125.4, filed Feb. 23, 2016, 11 pages.

UK Commercial Search Report mailed Jun. 28, 2016, Patent Application No. GB1603122.1, filed Feb. 23, 2016, 12 pages.

UK Commercial Search Report mailed Jun. 6, 2016, Patent Application No. 1604497.6, filed Mar. 16, 2016, 6 pages.

UK Commercial Search Report mailed Jun. 9, 2016, Patent Application No. GB1603117.1, filed Feb. 23, 2016, 12 pages.

UK Commercial Search Report mailed May 16, 2016, Patent Application No. GB1603125.4, 8 pages.

UK Commercial Search Report mailed May 20, 2016, Patent Application No. 1605026.2, 4 pages.

UK Commercial Search Report mailed May 24, 2016, Patent Application No. GB1605571.7, filed Apr. 1, 2016, 3 pages.

UK Commercial Search Report mailed May 9, 2016, Patent Application No. GB1603112.2, 6 pages.

UK Commercial Search Report mailed May 9, 2016, Patent Application No. GB1603114.8, filed Feb. 23, 2016, 2 pages.

UK Commercial Search Report mailed Nov. 14, 2016, Patent Application No. GB1607063.3, 8 pages.

UK Commercial Search Report mailed Nov. 30, 2016, Patent Application No. 1607058.3, filed Apr. 22, 2016, 7 pages.

UK Commercial Search Report mailed Oct. 10, 2016, Patent Application No. GB1607484.1, filed Apr. 29, 2016, 5 pages.

UK Commercial Search Report mailed Sep. 30, 2016, Patent Application No. 1606630.0, filed Apr. 15, 2016, 7 pages.

UK Expanded Commercial Search Report mailed Jun. 15, 2016, Patent Application No. 1605026.2, 5 pages.

UK IPO Search Report mailed Dec. 12, 2016, Patent Application No. GB1606630.0, filed Apr. 15, 2016, 4 pages.

UK IPO Search Report mailed Dec. 15, 2016, Patent Application No. GB1607063.3, 6 pages.

UK IPO Search Report mailed Dec. 21, 2016, Patent Application No. GB1607058.3, 3 pages.

UK IPO Search Report mailed Dec. 21, 2016, Patent Application No. GB1607058.3, filed Apr. 22, 2016, 3 pages.

UK IPO Search Report mailed Dec. 28, 2016, Patent Application No. GB1604497.6, filed Mar. 16, 2016, 4 pages.

UK IPO Search Report mailed Dec. 5, 2016, Patent Application No. 1607249.8, 4 pages.

UK IPO Search Report mailed Dec. 6, 2016, Patent Application No. 1604493.5, 6 pages.

UK IPO Search Report mailed Dec. 6, 2016, Patent Application No. 1607482.5, 5 pages.

UK IPO Search Report mailed Jan. 25, 2017, Patent Application No. 1605026.2, 3 pages.

UK IPO Search Report mailed Jan. 3, 2017, Patent Application No. 1604498.4, 4 pages.

UK IPO Search Report mailed Jul. 26, 2016, Patent Application No. GB1603114.8, filed Feb. 23, 2016, 5 pages.

UK IPO Search Report mailed Jul. 4, 2016, Patent Application No. GB1603125.4, 6 pages.

UK IPO Search Report mailed Jul. 4, 2016, Patent Application No. GB1603125.4, filed Feb. 23, 2016, 6 pages.

UK IPO Search Report mailed Jul. 5, 2016, Patent Application No. GB1603123.9, filed Feb. 23, 2016, 5 pages.

(56) References Cited

OTHER PUBLICATIONS

UK IPO Search Report mailed Oct. 17, 2016, Patent Application No. GB1603117.1, filed Feb. 23, 2016, 5 pages.
UK IPO Search Report mailed Oct. 21, 2016, Patent Application No. GB1603112.2, 4 pages.
UK IPO Search Report mailed Oct. 26, 2016, Patent Application No. GB1603122.1, filed Feb. 23, 2016, 4 pages.
UK IPO Search Report mailed Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action mailed Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
White, "How Computers Work," Que Publishing 7th Edition, Oct. 15, 2003, 44 pages.
Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.
Gutoski et al., "Hierarchical Deterministic Bitcoin Wallets That Tolerate Key Leakage", Lecture Notes in Computer Science book series (LNSC, vol. 8975), Jan. 1, 2015, 9 pages.
Mirzadeh et al., "CPFP: An Efficient Key Management Scheme for Large Scale Personal Networks", IEEE, 2008, 6 pages.
Menezes et al., "Handbook of Applied Cryptography," CRC Press, Oct. 16, 1996, 811 pages.
Deloitte, "Blockchain Technology a Game-changer in Accounting", Mar. 2016, 5 pages.
UK IPO Search Report mailed Dec. 23, 2016, Patent Application No. GB1604495.0, 5 pages.
github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.
UK Commercial Search Report mailed Jun. 9, 2016, Patent Application No. GB1603114.8 , 4 pages.
International Search Report and Written Opinion mailed Mar. 29, 2017, Patent Application No. PCT/IB2017/050821, 13 pages.
Bitcoin Forum, "Counterparty—Pioneering Peer-to-Peer Finance", https://bitcointalk.org/index.php?topic=395761.0. Feb. 1, 2014, 7 pages.
Buterin, "Introducing Ethereum Script 2.0", Ethereum Foundation Blog, Feb. 3, 2014, 9 pages.
Brown, "On Distributed Satabases and Distributed Ledgers", Thoughts on the Future of Finance, Nov. 8, 2016, https://gendal.me/page/3/, 44 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
International Search Report and Written Opinion mailed Aug. 3, 2018, Patent Application No. PCT/IB2018/053289, 10 pages.
UK Commercial Search Report mailed Jun. 12, 2017, Patent Application No. GB510912, 6 pages.
UK IPO Search Report mailed Oct. 9, 2017, Patent Application No. GB1707788.4, 6 pages.

Drwasho, "Openbazaar Documentation", Github, Jun. 2015, 53 pages.
Bluematt, "Contract", Bitcoin Wiki, Oct. 22, 2015, 12 pages.
UK IPO Search Report mailed Dec. 21, 2016, Patent Application No. GB1607484.1, 4 pages.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat et al., "Blockchain Electronic Vote," retrieved from https://www.weusecoins.com/assets/pdf/library/blockchain-electronic-vote.pdf, Apr. 29, 2015, 9 pages.
Noizat, "Handbook of Digital Currency Chapter 22: Blockchain Electronic Vote," Elsevier Inc., David Lee Kuo Chuen (ed.), May 2015, 9 pages.
NXT, "Voting," nxt.org, website archived on Feb. 18, 2016 [retrieved May 31, 2022], https://web.archive.org/web/20160218021746/https://nxt.org/what-is-nxt/voting/, 3 pages.

(56) References Cited

OTHER PUBLICATIONS

Openchain, "Home Page," openchain.org, Dec. 22, 2015 [retrieved May 8, 2020], https://web.archive.org/web/20151222083734/https://www.openchain.org/, 18 pages.
OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.
OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.
Perry, "Tapeke: Bitcoin Accounting for Non-Accountants," http://codinginmysleep.com/tapeke-bitcoin-accounting-for-non-accountants/, Jan. 21, 2015, 1 page.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.
Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.
Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.
Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.
Rockwell, "BitCongress—Process for Blockchain Voting & Law," retrieved from http://generalbitcoin.com/BitCongress_Whitepaper.pdf, Feb. 12, 2016, 8 pages.
Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.
Sams, "Ethereum: Turing-complete, programmable money," Cryptonomics, Feb. 1, 2014, https://cryptonomics.org/2014/02/01/ethereum-turing-complete-programmable-money, 4 pages.
Sanchez, "Marketplaces," GitHub, Jun. 10, 2015 [retrieved May 12, 2020], https://github.com/drwasho/openbazaar-documentation/blob/master/04%20Marketplaces.md, 37 pages.
Sanchez, "Protocol," Github, https://github.com/drwasho/openbazaar-documentation/blob/master/03%20Protocol.md, Jun. 15, 2015, 53 pages.
Sanchez, "Ricardian Contracts in OpenBazaar," Github, https://gist.github.com/drwasho/a5380544c170bdbbbad8, Jan. 2016, 12 pages.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Satoshi et al., "Connection Limits," Bitcoin Forum, Aug. 9, 2010, https://bitcointalk.org/index.php?topic=741.0; prev_next=prev, 2 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.
Taiwanese Office Action mailed Apr. 12, 2021, Patent Application No. 109142412, 5 pages.
Taiwanese Office Action mailed Jul. 28, 2020, Patent Application No. 106105709, 9 pages.
Taiwanese Office Action mailed Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Lazarovich, Amir, "Invisible Ink: Blockchain for Data Privacy", May 8, 2015, 85 pages.
Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.
Subramanian, et al., "The State of Cryptocurrencies, Their Issues and Policy Interactions", International Information Management Association, vol. 24, No. 24, No. 3, 2015, pp. 25-40.
Fimkrypto, "FIMK 0.6.4 Released," Github.com, Feb. 11, 2016 [retrieved Jan. 30, 2017], https://github.com/fimkrypto/fimk/releases, 17 pages.
Flood et al., "Contract as Automaton: The Computational Representation of Financial Agreements," Office of Financial Research Working Paper No. 15-04, Mar. 26, 2015, 25 pages.
Fotiou et al., "Decentralized Name-based Security for Content Distribution using Blockchains," retrieved from, Mobile Multimedia Laboratory, Department of Informatics, Apr. 14, 2016, 6 pages.
Franco, "Understanding Bitcoin: Cryptography, Engineering and Economics," Wiley, ISBN: 978-1-119-01916-9, Oct. 2014, 144 pages.
Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.
Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.
Fuchita, "Special Topic: Innovation and Finance, Blockchain and Financial Transaction Innovation," Nomura Capital Market Quarterly 19-2(74):11-35, Nov. 1, 2015.
Fujimura et al., "Bright: A Concept for a Decentralized Rights Management System Based on Blockchain," 2015 IEEE 5th International Conference on Consumer Electronics—Berlin (ICCE-Berlin), Sep. 6, 2015, 2 pages.
Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.
Gennaro et al., "Threshold-Optimal DSA/ECDSA Signatures and an Application to Bitcoin Wallet Security," International Conference on Applied Cryptography and Network Security, Jun. 9, 2016, 42 pages.
Gitbook, "Ethereum Frontier Guide," Gitbook (Legacy), Feb. 4, 2016, 293 pages.
Github, "Bitcoin/Bips," retrieved from http://web.archive.org/web/20150307191218/https://github.com/bitcoin/bips/blob/master/bip-0016.mediawiki, Apr. 5, 2014, 4 pages.

(56) References Cited

OTHER PUBLICATIONS

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Goldfeder et al., "Securing Bitcoin wallets via threshold signatures" Princeton's Center for Information Technology Policy, Mar. 28, 2014, 11 pages.
Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.
Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.
Hacker News, "Cryptocontracts Will Turn Contract Law into a Programming Language," retrieved from https://news.ycombinator.com/item?id=7287155, Feb. 23, 2014, 12 pages.
Hao, "On Robust Key Agreement Based on Public Key Authentication," International Conference on Financial Cryptography and Data Security, Jan. 25, 2010, 12 pages.
Harayama et al., "Key escrow method of personal decryptographic key by using elliptic curve calculation," Institute of Electronics, Information and Communication Engineers (IEICE) Technical Report 109(85):91-96, Jun. 11, 2009.
Hearn, "Distributed markets," Bitcoin Wiki, https://en.bitcoin.it/wiki/Distributed_markets, Jul. 11, 2015 [retrieved Sep. 20, 2016], 5 pages.
Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.
International Search Report and Written Opinion mailed Apr. 10, 2017, Patent Application No. PCT/IB2017/050861, 11 pages.
International Search Report and Written Opinion mailed Apr. 12, 2017, Patent Application No. PCT/IB2017/050818, 10 pages.
International Search Report and Written Opinion mailed Apr. 12, 2017, Patent Application No. PCT/IB2017/050829, 9 pages.
International Search Report and Written Opinion mailed Apr. 12, 2017, Patent Application No. PCT/IB2017/050866, 10 pages.
International Search Report and Written Opinion mailed Apr. 21, 2017, Patent Application No. PCT/IB2017/050820, 12 pages.
International Search Report and Written Opinion mailed Apr. 26, 2017, International Patent Application No. PCT/IB2017/050865, filed Feb. 16, 2017, 9 pages.
International Search Report and Written Opinion mailed Apr. 3, 2017, Patent Application No. PCT/IB2017/050824, filed Feburary 14, 2017, 13 pages.
International Search Report and Written Opinion mailed Apr. 3, 2017, Patent Application No. PCT/IB2017/050827, 10 pages.
International Search Report and Written Opinion mailed Apr. 3, 2017, Patent Application No. PCT/IB2017/050827, 13 pages.
International Search Report and Written Opinion mailed Mar. 29, 2017, Patent Application No. PCT/IB2017/050821, 10 pages.
International Search Report and Written Opinion mailed Mar. 30, 2017, Patent Application No. PCT/IB2017/050819, 13 pages.
International Search Report and Written Opinion mailed Mar. 30, 2017, Patent Application No. PCT/IB2017/050825, 9 pages.
International Search Report and Written Opinion mailed May 29, 2017, International Patent Application No. PCT/IB2017/050815, filed Feb. 14, 2017, 10 pages.
International Search Report and Written Opinion mailed May 31, 2017, Patent Application No. PCT/IB2017/050856, iled Feb. 16, 2017, 11 pages.
International Search Report and Written Opinion mailed May 31, 2017, Patent Application No. PCT/IB2017/050867, 11 pages.
International Search Report and Written Opinion mailed May 31, 2017, Patent Application No. PCT/IB2017/050979, filed Feb. 21, 2017, 11 pages.
International Search Report and Written Opinion mailed May 31, 2017, Patent Application No. PCT/IB2017/050980, 12 pages.
Japanese Notice of Reason(s) for Rejection mailed Mar. 30, 2021, Patent Application No. 2018-539890, 8 pages.
Japanese Notice of Reason(s) for Rejection mailed Mar. 30, 2021, Patent Application No. 2018-539893, 6 pages.
Japanese Office Action mailed Feb. 16, 2021, Patent Application No. 2018-539331, 7 pages.
Japanese Office Action mailed Jan. 22, 2019, Patent Application No. 2018-516682, filed Feb. 16, 2017, 14 pages.
Japanese Office Action mailed Oct. 6, 2020, Patent Application No. 2018-539865, 14 pages.
Japanese Office Action mailed Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.
Il2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p. 1, 22 pages.
Kens et al., "Cryptocontracts Will Turn Contract Law Into a Programming Language," Hacker News, Feb. 23, 2014, https://news.ycombinator.com/item?id=7287155, 12 pages.
Killerstorm et al., "Transcript for #bitcoin-dev 2012/09/03," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78(1):87-102, publication available online Oct. 1, 2015, print publication Jan. 2016.
Greenspan, Dr. Gideon, "MultiChain Private Blcokchain", White Paper, Jun. 2015, 17 pages.
Swanson, Tim, "Watermarked Tokens and Pseudonymity on Public Blockchains", Nov. 4, 2015, 78 pages.
Manabu Takata et al., "Nikkei BP Mook, FinTech Revolution, Financial Common Sense Dissolved by Technology", Nikkei Business Publications, Inc., Jan. 27, 2016, ISBN: 978-4-8222-7188-6, pp. 44-47.
Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.
Bitfury Group, "Public Versus Private Blockchains", Part 2: Permissionless Blackchains, in collaboration with Jeff Garzik, Version 1.0, Oct. 20, 2015, 20 pages.
Feng et al., "A Next Generation Cryptocurrency Platform Ethereum and Its Evaluation", Oct. 14, 2015, 12 pages.
Ramaswami, U., et al., "Genotype and Phenotype in Hypochondroplasia", 1998, Mosby, Inc., 5 pages.
UK Commercial Search Report mailed Jan. 18, 2017, Patent Application No. GB510135, filed Mar. 16, 2016, 5 pages.
Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.
The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 pages.
Gauthierdickey, et al. "Secure Peer-to-Peer Trading in Small and Large Scale Multiplayer Games", Multimedia Systems, Apr. 29, 2014, 13 pages.

* cited by examiner

METHOD AND SYSTEM FOR SECURING COMPUTER SOFTWARE USING A DISTRIBUTED HASH TABLE AND A BLOCKCHAIN

CROSS-REFERENCE TO RELATED APPLICATIONS

This application is a continuation of U.S. patent application Ser. No. 16/079,074, filed Aug. 22, 2018, entitled "A METHOD AND SYSTEM FOR SECURING COMPUTER SOFTWARE USING A DISTRIBUTED HASH TABLE AND A BLOCKCHAIN," which is a 371 Nationalization Patent Application of International Patent Application No. PCT/IB2017/050827, filed Feb. 14, 2017, entitled "A METHOD AND SYSTEM FOR SECURING COMPUTER SOFTWARE USING A DISTRIBUTED HASH TABLE AND A BLOCKCHAIN," which claims priority to United Kingdom Patent Application No. GB1607058.3, filed Apr. 22, 2016, entitled "A METHOD AND SYSTEM FOR SECURING COMPUTER SOFTWARE USING A DISTRIBUTED HASH TABLE AND A PEER-TO-PEER DISTRIBUTED LEDGER," and claims priority to United Kingdom Patent Application No. GB1603125.4, filed Feb. 23, 2016, entitled "A METHOD AND SYSTEM FOR SECURING COMPUTER SOFTWARE USING A DISTRIBUTED HASH TABLE AND A PEER-TO-PEER DISTRIBUTED LEDGER," the disclosures of which are incorporated herein by reference in their entirety.

TECHNICAL FIELD

The present disclosure relates to blockchain technology, security mechanisms and asset transfer. It is particularly suited for use as a mechanism for securing digital assets such as computer software and authorising/controlling access to the asset (e.g., computer software) using a distributed hash table and a peer-to-peer distributed ledger (e.g., blockchain).

BACKGROUND

In this document we use the term 'blockchain' to include all forms of electronic, computer-based, distributed ledgers. These include, but are not limited to, consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking then unlocking scripts evaluates to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof record of events, distributed processing, etc) while being more versatile in their applications.

One area of current research is the use of the blockchain for the implementation of "smart contracts". These are computer programs designed to automate the execution of the terms of a machine-readable contract or agreement. Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain, providing enhanced security.

It would be advantageous to be able to use security-related features such as cryptography and blockchain technologies for the purpose of transmitting, sharing or controlling access to digital assets such as, for example, computer software. Traditional approaches to securing the integrity and sharing of computer software involve the digital signing of the executables of the computer software. For instance, signing the executable or other associated code with a cryptographic pair of keys, such as a public key and a private key. The public key is often obtained from a trusted central authority such as a certification authority.

Computer software is often accompanied by a licence containing contractual obligations. The licence may contain the terms that govern the use or redistribution of the software. An issue may arise where the computer software or the associated licence is unlawfully transferred to another user.

Any discussion of documents, acts, materials, devices, articles or the like which have been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Embodiments of the invention may comprise a method and corresponding system for controlling access to, and/or transmission of, a controlled digital resource or asset. The invention may comprise a computer-implemented method for determining a metadata (M) for securing a controlled digital resource using a distributed hash table and a peer-to-peer distributed ledger (e.g. blockchain). It may be described as a security method/system or a control method/system. It may be described as a method/system for securing the integrity of, control of and/or access to the controlled digital resource. The invention may comprise an authentication or authorisation method/system.

In one embodiment, the controlled digital resource may be computer software. Hereafter, the term "software" or "computer software" may be used instead of "controlled digital asset".

The method may comprise the steps of:
determining a data (D1) associated with the computer software;
determining a first hash value (H1) of the computer software;
determining a second hash value (H2) based on the data (D1) and the computer software;
sending, over a communications network, the data (D1), the first hash value (H1) and the second hash value (H2) to an entry for storage in a distributed hash table, wherein the second hash value (H2) is a key of a key-value pair and the data (D1) and the first hash value (H1) are a value in the key-value pair; and
determining a metadata (M) comprising the second hash value (H2) for storage on the peer-to-peer distributed ledger.

The method may further comprise determining a first redeem script (RS1), wherein the first redeem script is based on the metadata (M); and an agent public key (PA) associated with an agent (A). The redeem script may be a redeem script for a blockchain transaction (Tx).

The method may further comprise sending, over the communications network, a first data output (O1) for storage on the peer-to-peer distributed ledger based on an indication of a first quantity of cryptocurrency (C1) to be transferred, wherein the first quantity of cryptocurrency (C1) is associated with the first redeem script (RS1); and the first redeem script (RS1).

In the method, the data (D1) may comprise a licence associated with the computer software. The licence may be associated with a first user (U1) or a second user (U2) and further comprise a first user public key (PU1) associated with the first user (U1) or a second user public key (PU2) associated with the second user (U2). The licence may further comprise a hash value associated with at least one electronic device of the first user (U1) or the second user (U2). The licence may further comprise the first hash value (H1).

In the method, the second hash value (H2) may comprise a top hash value of a Merkle tree.

The invention may provide a computer-implemented method for authorising access to the computer software for a first user (U1), the method comprising determining a metadata (M) for securing a computer software according to the method described above; determining a second redeem script (RS2), wherein the second redeem script (RS2) is based on: the metadata (M); the agent public key (PA) associated with the agent (A); and the first user public key (PU1) associated with the first user (U1); sending, over a communications network, a second data output (O2) to the peer-to-peer distributed ledger based on: an indication that the first quantity of cryptocurrency (C1) from the first data output (O1) is to be transferred; and the second redeem script (RS2).

The method may further comprise determining an identifier indicative of the location of the computer software or the licence; assigning the identifier to the value in the key-value pair; and sending, over the communications network, the identifier to the entry on the distributed hash table.

A method for determining the location of the computer software or licence, the method comprising: determining a metadata (M) for securing a computer software according to the method described above; determining an identifier indicative of the location of the computer software or the licence; assigning the identifier to the value in the key-value pair; sending, over the communications network, the identifier to the entry on the distributed hash table; determining the metadata (M) from the first redeem script (RS1); retrieving the second hash value (H2) from the metadata (M); sending, over the communications network, the second hash value (H2) to a processor associated with a participating node of the distributed hash table; and determining, from the processor of the participating node, an identifier indicative of the location of the computer software or licence.

In the methods described above, the cryptocurrency may be Bitcoin and the peer-to-peer distributed ledger may be the Bitcoin Blockchain.

Embodiments of the invention may comprise the step of providing metadata in a redeem script at a location which is designated in a blockchain protocol as a location for a cryptographic key.

One or more embodiments of the invention may comprise a method of embedding metadata in a blockchain transaction, substantially as described in the section below entitled "metadata". This may comprise the steps of:
generating a blockchain transaction (Tx) having an output (TxO) related to a digital asset and a hash of a redeem script which comprises:
metadata comprising a token which is a representation of, or a reference to, a tokenised entity; and
at least one public cryptographic key.

The digital asset may be a quantity of cryptocurrency. The metadata may be provided in the redeem script at a location which is designated in a blockchain protocol as a location for a cryptographic key. The transaction Tx may be submitted to a blockchain network.

A computer software program comprising machine-readable instructions to cause a processing device to implement the methods described above.

A computer system for determining a metadata (M) for securing computer software using a distributed hash table, the system comprising a processing device associated with a node, configured to: determine a data (D1) associated with the computer software; determine a first hash value (H1) of the computer software; determine a second hash value (H2) based on the data (D1) and the computer software; send, over a communications network, the data (D1), the first hash value (H1) and the second hash value (H2) to an entry for storage in a distributed hash table, wherein the second hash value (H2) is assigned to a key of a key-value pair and the data (D1) and the first hash value (H1) are a value in the key-value pair; and determine a metadata (M) comprising the second hash value (H2).

Figure 2:
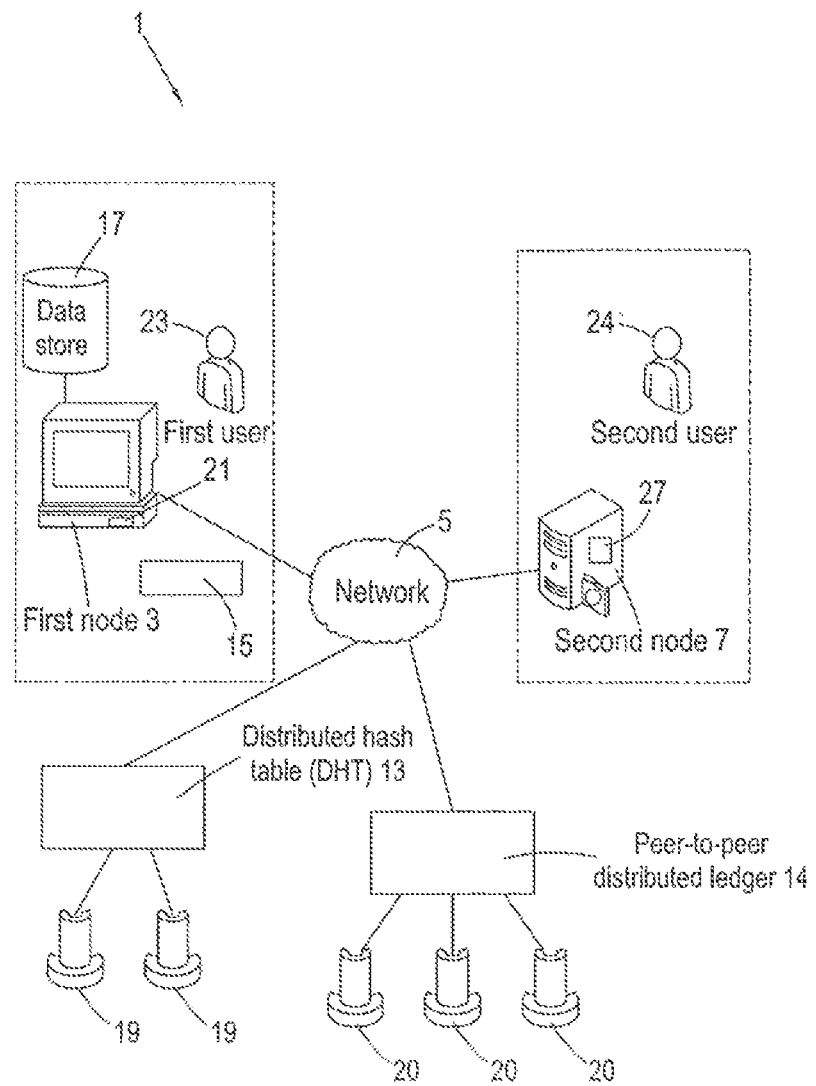
Figure 3:
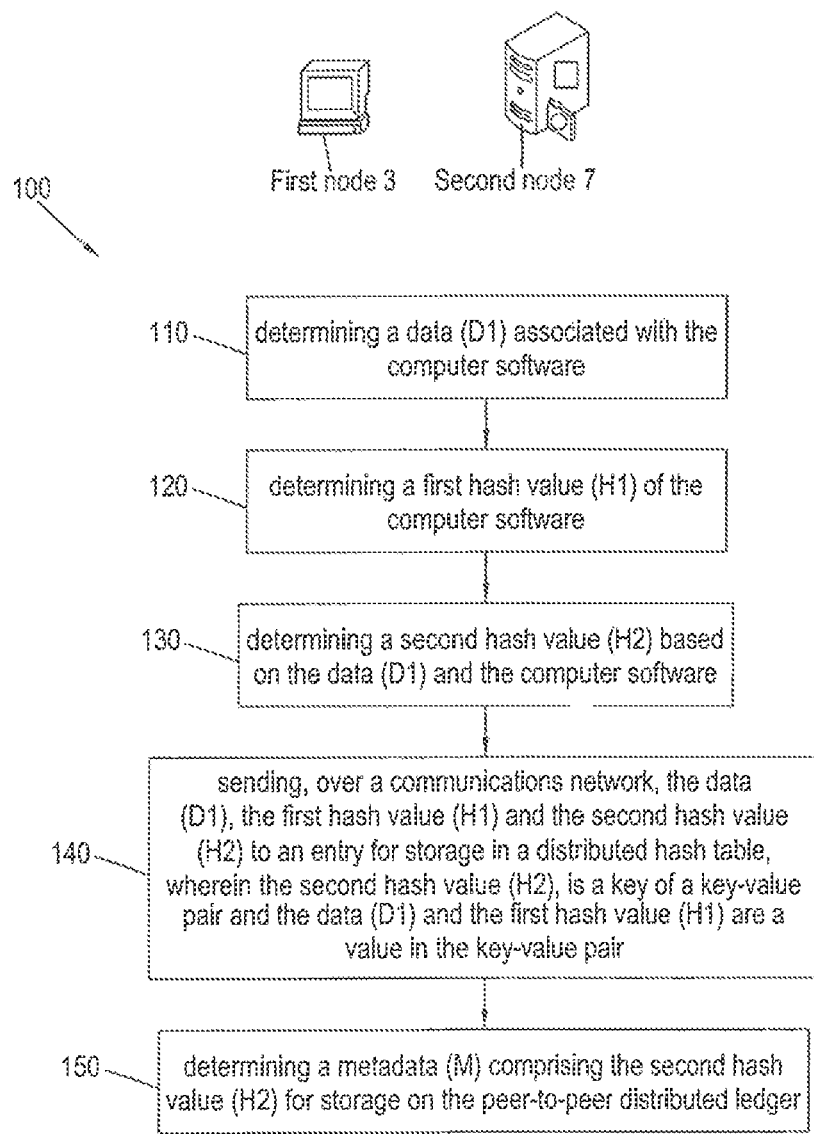
Figure 4:
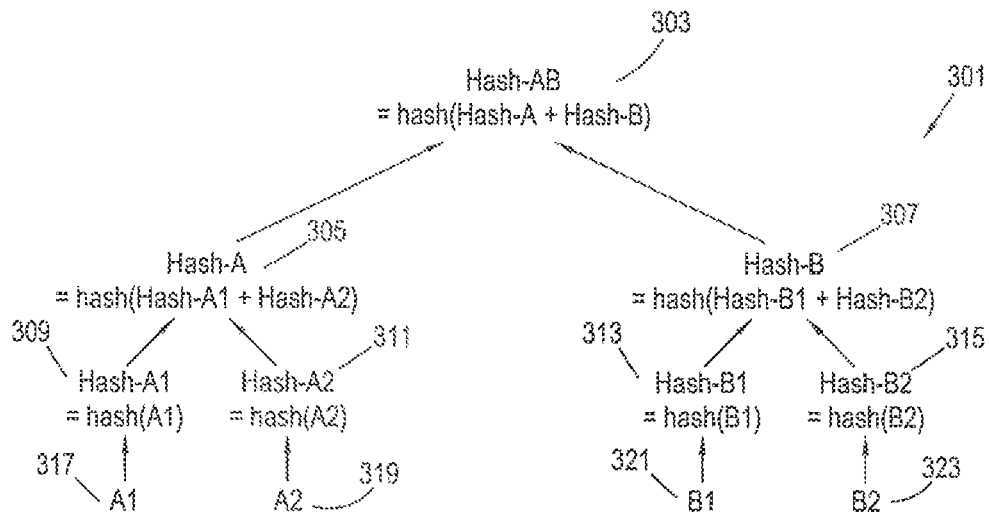
Figure 5:
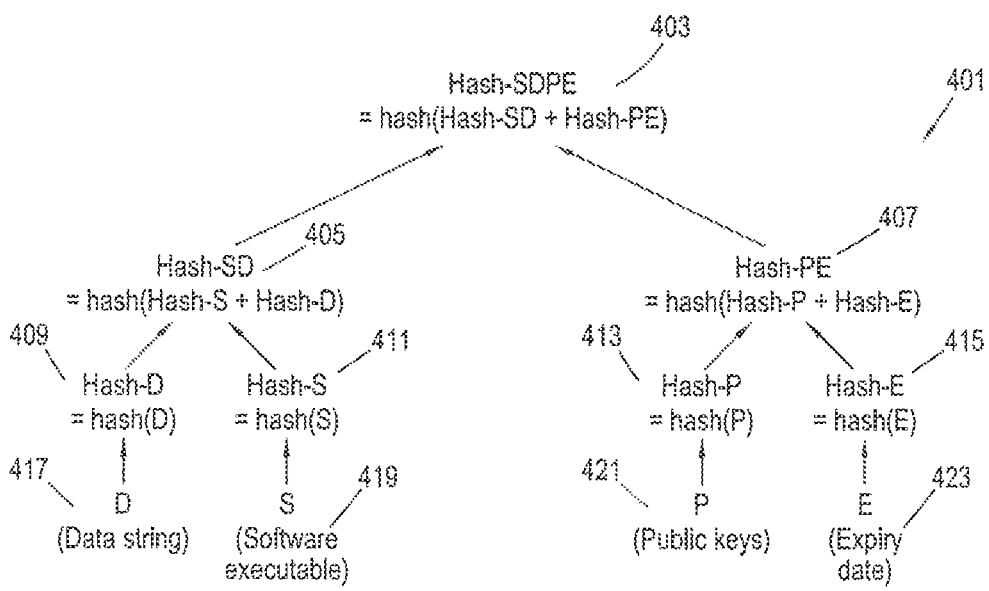
Figure 6:
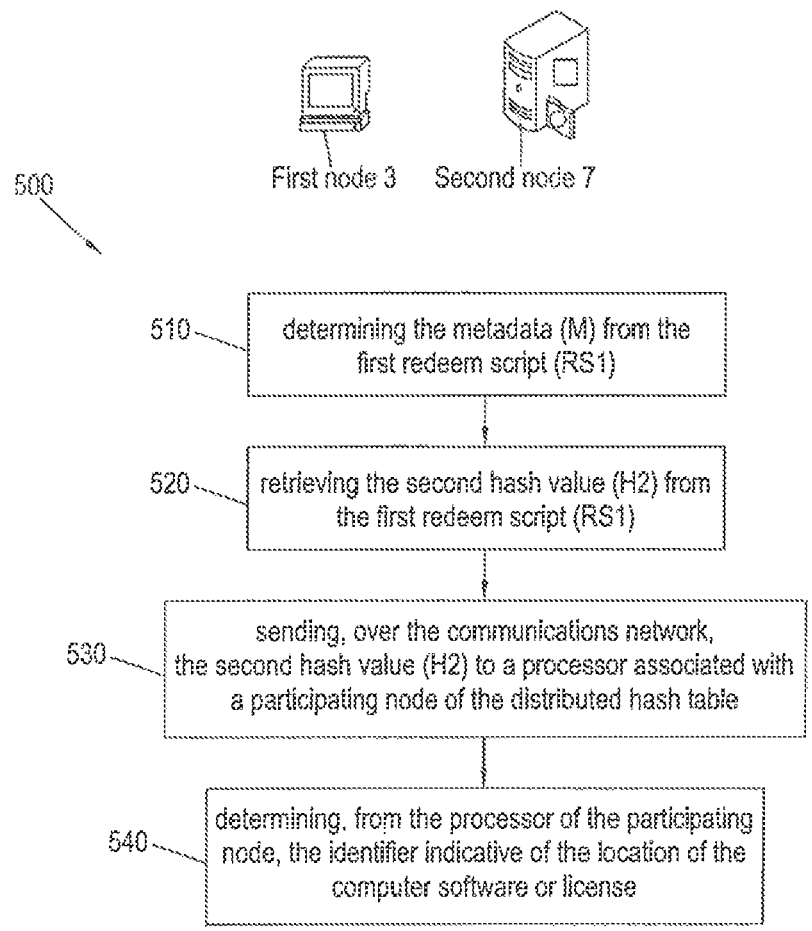
Figure 7:
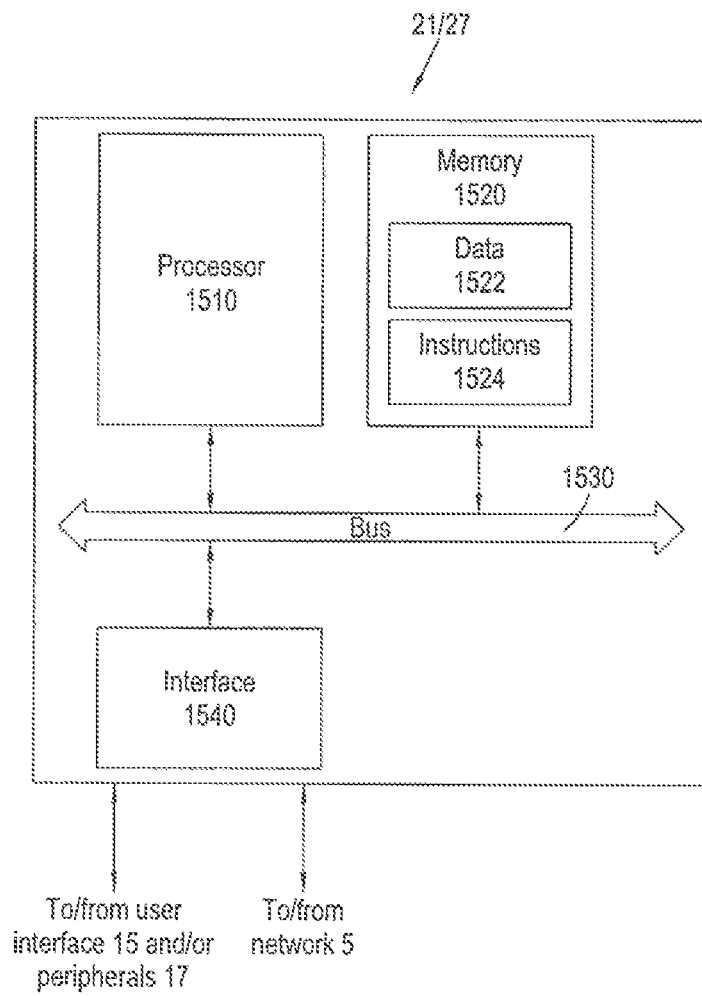

Examples of the present disclosure will be described with reference to:

FIG. 2 illustrates a schematic diagram of an example system for determining a metadata (M) for securing computer software using a distributed hash table;

FIG. 3 illustrates a flow chart of a computer-implemented method for determining a metadata (M) for securing a computer software using a distributed hash table;

FIG. 4 illustrates an example of a Merkle tree;

FIG. 5 illustrates an example of a Merkle tree with reference to a computer software and a licence associated with a computer software;

FIG. 6 illustrates a flow chart of a computer-implemented method for determining an identifier indicative of the location of a computer software using a distributed hash table; and FIG. 7 illustrates a schematic of an example processing device.

DESCRIPTION OF EMBODIMENTS

The present disclosure generally relates to methods and systems for utilising a distributed hash table and a peer-to-peer (P2P) distributed ledger, such as the Bitcoin Blockchain, to enable securing a computer software.

While embodiments described below may refer specifically to transactions that occur on the Bitcoin Blockchain (referred to herein as the blockchain), it will be appreciated that the present invention may be implemented using other P2P distributed ledgers. The blockchain is used below to describe aspects of the invention for simplicity only due to its high level of standardisation and large quantity of associated public documentation.

Distributed Hash Table

In a typical client/server model a central server may be in charge of the majority of resources. This means that in the event of an attack on or failure of the central server, the majority of the resources stored on the central server may be compromised. On the contrary, in a distributed model the resources are shared ("distributed") between participating nodes. In this way, the capacity of all participating nodes is utilised and the failure of one server will not compromise the majority of the resources.

Figure 1:
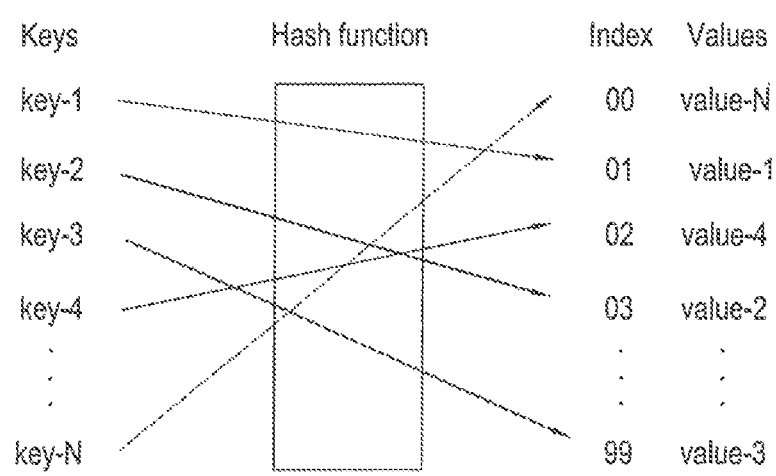
FIG. 1 illustrates an example of a hash table.

FIG. 1 illustrates an example of a hash table. The hash table is comprised of key-value pairs. The key of each key-value pair is mapped, by way of a hash function, to an index. The index defines the location of stored values of the key-value pairs.

A DHT is an example of applying the distributed model to a hash table. Similar to a hash table, a DHT comprises key-value pairs and provides an efficient method to locate ("lookup") a value of a key-value pair given just the key. However, in contrast to the hash table, the key-value pairs are distributed and stored by a number of participating nodes. In this way, responsibility for storing and maintaining the key-value pairs is shared by the participating nodes.

In the same way as a hash table, each key-value pair in the DHT is mapped to an index. The index is determined for each key-value pair by performing a hash function on the key. For example, the cryptographic Secure Hash Algorithm SHA-1 may be used to determine the index.

Each participating node is assigned at least one index by keyspace partitioning. For each index that the participating node is assigned, the participating node stores the value of that key-value pair.

It is an advantage that values of the key-value pairs may be efficiently retrieved. To retrieve a value associated with a key, a node may execute a "lookup" to determine the responsible node (via the index). The responsible node may then be accessed to determine the value.

Bitcoin and the Blockchain

As is well known in the art, a blockchain is a transaction type ledger where storage capacity is distributed across networked nodes participating in a system based on the Bitcoin protocol. Each Bitcoin transaction is broadcast to the network, the transactions are confirmed and then aggregated into blocks. The blocks are then included on the Blockchain by storing the blocks at multiple participating nodes.

A full copy of a cryptocurrency's P2P distributed ledger contains every transaction ever executed in the cryptocurrency. Thus, a continuously growing list of transactional data records is provided. Since each transaction entered onto the blockchain is cryptographically enforced, the blockchain is hardened against tampering and revision, even by operators of the participating nodes.

Due to the transparency of the blockchain, histories are publicly available for each transaction.

It is a further advantage of the blockchain is that the transaction is also the record of the transaction, i.e. the transaction is embedded within the blockchain.

In this way, the information relating to the transaction is captured in the actual transaction. This record is permanent and immutable and therefore removes the requirement for a third party to keep the transaction record on a separate database. Advantageously, the invention may use techniques to facilitate this control or transfer of an asset, such as software, via a blockchain, and may enable the transfer to be performed in a secure manner, incorporating the use of cryptographic keys, while not requiring any alteration of the underlying blockchain protocol.

Pay-to-Script-Hash and Multi-Signature

While embodiments below may refer specifically to transactions that use the pay-to-script-hash (P2SH) method of the Bitcoin protocol, it will be appreciated that the present invention may be implemented using another functionally equivalent method of a blockchain Bitcoin protocol.

Each transaction record on the blockchain comprises a script including information indicative of the transaction and a number of public keys. These public keys may be associated with the sender and recipient of the cryptocurrency. A P2PKH input includes the public key of the sender. A P2PKH output includes the hash of the public key of the recipient. A P2SH multisig input includes the signature of the senders. A script can be considered as a list of instructions recorded with each transaction record on the blockchain that describes how a user may gain access to the cryptocurrency specified in the transaction record.

As background, in a standard P2SH method of the Bitcoin protocol, the output script, or redeem script, may take the form:

<NumSigs PubK1 PubK2 PubK15 NumKeys OP_CHECKMULTISIG> where NumSigs is the number "m" of valid signatures required to satisfy the redeem script to unlock the transaction; PubK1, PubK2 PubK15 are the public keys that correspond to signatures that unlock the transaction (up to a maximum of 15 public keys) and NumKeys is the number "n" of public keys.

In the Bitcoin protocol, signatures based on a user's private key may be generated using the Elliptic Curve Digital Signature Algorithm. The signatures are then used for redemption of the cryptocurrency associated with the output script or redeem script. When a user redeems an output script or redeem script, the user provides their signature and public key. The output script or redeem script then verifies the signature against the public key.

To redeem the above redeem script, at least a number "m" of signatures corresponding to the public keys are required. In some examples, the order of the public keys is important and the number "m" out of "n" signatures for signing must be done in sequence. For example, consider where "m" is 2 and "n" is 15. If there are two signatures available for use, Sig1 (corresponding to PubK1) and Sig 15 (corresponding to PubK15), the redeem script must be signed by Sig1 first followed by Sig15.

Overview of the System

A method, device and system for determining a metadata (M) for securing computer software will now be described.

FIG. 2 illustrates a system 1 that includes a first node 3 that is in communication with, over a communications network 5, a second node 7. The first node 3 has an associated first processing device 21 and the second node 5 has an associated second processing device 27. Examples of the first and second nodes 3, 7 include an electronic device, such as a computer, tablet computer, mobile communication device, computer server etc.

A DHT 13 to record and store key-value pairs is also illustrated in FIG. 2. The DHT 13 may be associated with one or more processing devices 19 to receive, record and store the values of the key-value pairs. The processing devices 19 may be used by "participating nodes" of the DHT 13. As described above, the DHT 13 provides an efficient method to locate values of key-value pairs.

FIG. 2 also illustrates a P2P distributed ledger 14 to record transactions. The P2P distributed ledger 14 may be associated with one or more processing devices 20 to receive and record transactions. As described above, an example of a P2P distributed ledger 14 is the Bitcoin Blockchain. Therefore, in the context of the blockchain, the processing devices 20 associated with the P2P distributed ledger 14 may be processing devices referred to as "miners".

The first node 3 is associated with a first user 23 and the second node 7 is associated with a second user 24. In one example, the first node 3 may represent a vendor of the computer software. In another example, the first node 3 may represent an agent or service provider. In yet another example, the first node 3 may represent a user of the computer software.

Similarly, the second node 7 may represent the agent, service provider, vendor of the computer software or a user of the computer software.

In one example, the first node 3 performs the method 100, 500 as illustrated by FIG. 3 and FIG. 6. In another example, the second node 7 performs the method 100, 500. While the exemplary embodiments below may refer to the first node 3 as performing the methods it is to be understood the disclosure may also be adapted or modified to be performed by other nodes.

The method 100 as illustrated by FIG. 3 includes determining 110 a data (D1) associated with the computer software. The data (D1) may further comprise a licence associated with the computer software. The method 100 also includes determining 120 a first hash value (H1) based on the computer software. In one example, the first hash value (H1) may be in relation to an executable of the computer software.

The method 100 also includes determining 130 a second hash value (H2) based on the data (D1) and the computer software. In one example, the second hash value (H2) may be representative of the details of the computer software and the licence associated with the computer software. In a further example, the second hash value (H2) may comprise additional information.

The method 100 further includes sending 140, over a communications network 5, the data (D1), the first hash value (H1) and the second hash value (H2) to an entry on a distributed hash table 13, wherein the second hash value (H2) is assigned to a key of a key-value pair and the data (D1) and the first hash value (H1) are assigned to the value in the key-value pair. The value in the key-value pair may further comprise an identifier indicative of the location of the computer software or licence.

The method 100 also includes determining 150 a metadata (M) that is based on the second hash value (H2) for inclusion on the peer-to-peer distributed ledger 14. In one example, the metadata (M) may be included in a first redeem script (RS1) for inclusion on the peer-to-peer distributed ledger 14.

A detailed example of the method will now be described.

Determining a Data Associated with the Computer Software 110

As described above the method 100 includes determining 110 a data (D1) associated with the computer software. Determining 110 a data (D1) may comprise receiving the data (D1) from a user, node or data store. Determining 110 a data (D1) may further comprise generating the data (D1) at the first node 3.

In one example, the first node 3 may receive the data (D1) from the first user 23 via the user interface 15. In another example, the first node 3 may receive the data (D1) from the second user 24. In yet another example, the first node 3 may receive the data (D1) from a data store 17.

Data (D1) is associated with the computer software where data (D1) may identify the computer software, additional information, a licence of the computer software or be indicative of the location of the computer software. For example, the data (D1) may comprise a string or data structure that identifies the computer software. The string or data structure may comprise a collection of identifying keywords and/or additional information about the computer software. An example of additional information may be an identifier of the version of the computer software, for example a numeral. For instance, if the computer software is entitled BobSoftware and the version is 3.0, the string or data structure (D1) may comprise "BobSoftware/3.0".

In a further example, the data (D1) may comprise an identifier of a licence associated with the computer software. This may be a software licence identification number (ID) or a software licence key. In another example, the identifier of the licence may comprise a cryptographic hash of the contents of the licence.

The data (D1) may further comprise an identifier indicative of the storage location of the computer software. In one example, the identifier may comprise a URL for an object on the Internet. In a further example, a link to the storage location of the computer software on a repository such as a hash table or distributed hash table may be provided.

In yet a further example the data (D1) may comprise information that identifies the vendor of the computer software. This may include personal details such as name, address, contact details or a public key associated with the vendor.

Determining a First Hash Value (H1) Based on the Computer Software 120

As also described above the method 100 further includes determining 120 a first hash value (H1) of the computer software. Determining 120 a first hash value (H1) may comprise receiving the first hash value (H1) from a user or accessing the first hash value (H1) from a data store. Determining 120 a first hash value (H1) may further comprise calculating the hash value at the first node 3.

In one example, the first node 3 may receive the first hash value (H1) from the first user 23 via the user interface 15. In another example, the first node 3 may receive the first hash value (H1) from the second user 24. In yet another example, the first node 3 may access the first hash value (H1) from a local data store 17 or remote data store.

In one example, the first hash value (H1) is of an executable of the computer software. The executable of the computer software may be retrieved from the communications network 5 such as the Internet. In another example, the executable may be provided by the first user 23 or the second user 24. In yet another example, the executable may be retrieved from the data store 17. In yet a further example, the executable may be retrievable from a repository such as a hash table or a DHT.

The hash of the executable of the software may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on the Zémor-Tillich hash function and knapsack-based hash functions.

Determining a Second Hash Value (H2) Based on the Data (D1) and the Computer Software 130

The method 100 also includes determining 130 a second hash value (H2) based on the data (D1) and the computer software.

In one example, the second hash value (H2) may be determined based on the hash of the concatenation of the data (D1) and the executable (or hash of the executable, that is, the first hash value (H1)) of the computer software. In a further example, the second hash value (H2) may be determined based on the hash of the concatenation of the data (D1), the executable (or hash of the executable) of the computer software and additional information.

Additional information may comprise a public key of the first user 23 (PU1) or second user 24 (PU2). In a further example the additional information may comprise an identifier of an entity associated with the first user 23 or second user 24. For instance, the entity may be an employer of the first user 23 or second user 24. In another example, the entity may be a service provider of the first user 23 or second user 24.

The additional information may further comprise a device identifier of a device associated with the first node 3, second node 7, first user 23 or second user 24. An example of a device is the first processing device 21 as illustrated in FIG. 2. The device identifier may comprise at least one of the following: a MAC address, motherboard serial number or a device identification number. The device identifier may further be a concatenation of at least two of the MAC address, motherboard serial number or device identification number. In a further example the device identifier may comprise a hash value associated with the MAC address, motherboard serial number or device identification number, or the concatenation described above.

In yet a further example the additional information may comprise an expiry date of the licence associated with the computer software.

Licence Associated with the Computer Software

In a further example, the second hash value (H2) may be determined based on the concatenation of the data (D1), the executable (or hash of the executable) of the computer software, additional information or the licence that relates to the computer software.

The representation of the licence may be a file or document which specifies the content of the licence. For example, plain ASCII text, a PDF document or a Word document. The second hash value (H2) may include the licence in its original form, or for example it may provide a link to the location of the licence on a publicly accessible communications network such as the Internet. In a further example, a link to the location of the licence on a repository such as a hash table or DHT may be provided. In yet a further example, a link to the location of the licence on a computer-based resource, such as the data store 17 may be provided.

In one example, the licence may comprise the first hash value (H1) associated with the computer software.

The licence associated with the computer software may further comprise additional information as described above. In one example, the licence may be associated with a first user 23 or second user 24. The licence may comprise the public key of the first user 23 (PU1) or second user 24 (PU2). In a further example the licence may comprise an identifier of an entity associated with the first user 23 or second user 24.

The licence associated with the computer software may further comprise a device identifier of a device associated with the first node 3, second node 7, first user 23 or second user 24. An example of a device is the first processing device 21 as illustrated in FIG. 2. The device identifier may comprise at least one of the following: a MAC address, motherboard serial number or a device identification number. The device identifier may further be a concatenation of at least two of the MAC address, motherboard serial number or device identification number. In a further example the device identifier may comprise a hash value associated with the MAC address, motherboard serial number or device identification number, or the concatenation described above.

The first user 23 may be the vendor of the computer software and the second user 24 may be the recipient ("end user") of the computer software. In another example the second user 23 may be the vendor of the computer software and the second user 24 may be the end user of the computer software.

In one example the licence associated with the computer software may authorise only one end user (a "single-user licence"). In a further example, the licence associated with the computer software may authorise one device of the end user (a "single-device licence"). In another example the licence associated with the computer software may authorise more than one device of the end user (a "multi-device licence").

In another example, there may be more than one end user (a "multi-user licence"). In a further example, the licence associated with the computer software may authorise one device per end user. In another example the licence associated with the computer software may authorise more than one device per end user.

In the event that the licence is associated with a first user 23 or a second user 24, the licence may comprise the first user public key (PU1) associated with the first user 23 and the second user public key (PU2) associated with the second user 24.

Merkle Tree

In another example, the licence may be the top hash value of a Merkle tree. An example of a Merkle tree is illustrated in FIG. 4. In a Merkle tree, the hash value at each node are hashes of their respective "child" nodes. For example, the hash value Hash-A 305 is the hash of the hash values at the two "child" nodes 309 and 311. It can be seen that the top hash value of the Merkle tree, Hash-AB 303, comprises all the hash values in the Merkle tree. That is, it captures the hash values of the four "leaves" at the bottom of the tree, A1 317, A2 319, B1 321 and B2 323.

In an example of the present disclosure, each "leaf" of the Merkle tree may represent an aspect of the information of the licence. An exemplary licence is illustrated in FIG. 5. The data (D1) 417 is captured in the hash value Hash-D 409, the executable of the software 419 is captured in the hash value Hash-S 411 (H1), the public keys 421 of users 23 and/or 24 are captured in the hash value Hash-P 413 and the expiry date 423 is captured in the hash value Hash-E 415. It can be seen that the nodes 405 and 407 capture the hash values associated with the leaves for data (D1) 417 and software 419, and public keys 421 and expiry date 423 respectively.

It is to be appreciated that other information not otherwise described above may comprise the additional information that the hash value (H2) is based on.

Sending the Data (D1), First Hash Value (H1) and Second Hash Value (H2) to a Distributed Hash Table 140

The method 100 also includes sending 140, over a communications network 5, the data (D1), first hash value (H1) and the second hash value (H2) to an entry on a distributed hash table 13.

In one example, the second hash value (H2) may be a key of a key-value pair, and the data (D1) and the first hash value (H1) may be a value in the key-value pair.

In a further example, additional information as described above may also be part of the value in the key-value pair. This includes but is not limited to: public keys of the first user 23 or second user 24, a device identifier of a device associated with the first node 3, second node 7, first user 23 or second user 24, an identifier indicative of the location of the computer software or licence, or further additional information associated with the licence.

As described above, a DHT 13 is comprised of key-value pairs, where each key-value pair is assigned to an index. In one example, the second hash value (H2) may be used to generate the index. A hash function or cryptographic hash function may be performed on the second hash value (H2). For instance, the cryptographic function SHA-1 may be used:

Index=SHA-1(H2)

For the second hash value (H2) to be the key of a key-value pair in the DHT 13, and the data (D1) and the first hash value (H1) to be the value in the key-value pair, the key and value are sent to any participating node of the DHT 13.

In one example, a message such as put(key, value) may be sent to a participating node of the DHT 13, where key is the second hash value (H2) and value is the data (D1) and the first hash value (H1). The message may be sent around all participating nodes until it is received by the participating node that is assigned to the index as indicated by the keyspace partitioning. The participating node assigned to the index indicated in the message may then store the key-value pair on the DHT 13 and assume responsibility for maintaining the entry associated with the key-value pair.

It is an advantage that the value of any given key may be retrieved from the DHT 13. In one example, the first user 23 or second user 24 may wish to retrieve the value. The first user 23 or second user 24, via the first node 3, second node 7 or another node not otherwise illustrated, may provide any participating node of the DHT 13 a request message such as get(key). The request message may then be sent around all participating nodes until it is received by the participating node that is assigned to the index as indicated by the keyspace partitioning.

Determining a Metadata (M) 150

The method 100 further includes determining 150 a metadata (M) that comprises the second hash value (H2). Determining 150 a metadata (M) may comprise receiving the metadata (M) from a user, node or data store. The metadata (M) may be included in, for example, in one or more of the 15 places available for the public keys in a P2SH multi-signature first redeem script (RS1) of a transaction on the P2P distributed ledger (blockchain) 14.

The first redeem script (RS1) of the transaction on the P2P distributed ledger 14 may represent an issuance, or creation, of a tokenised transaction ("issuance token") that represents the content included in the metadata (M). In one example, the token may be issued by an agent (A).

In the P2SH method of the Bitcoin protocol, metadata may be included in a redeem script by way of the method described below.

Metadata

Metadata (M) may be embedded in one or more of the 15 places available for the public keys in a P2SH multi-signature redeem script (RS1). For example, the redeem script (RS1) may take the form of:

<NumSigs Metadata1 Metadata2 . . . PubK1 PubK2 . . . NumKeys OP_CHECKMULTISIG> where Metadata1 and Metadata2 each include metadata that takes the place of a public key in the redeem script and PubK1 and PubK2 are public keys. In other words, the metadata may be provided in the redeem script at a location which is designated by the blockchain protocol as a position where a cryptographic key should be provided. This provides the advantage that the metadata can be incorporated into the transaction (Tx) without any change to the underlying blockchain protocol.

Metadata (M) may comprise the second hash value (H2). The metadata (M) may further comprise a description or keyword describing conditions associated with the computer software or licence. For example, the date of the licence, name, date of birth, address, contact details, or other details of the user associated with the licence. In a further example, information associated with the quantity of cryptocurrency may be included.

The metadata (M) may include the information in a number of ways. In one example, the contents of the information may be included. In a further example, a cryptographic hash of the information may be included. The hash of the information may be determined using the SHA-256 algorithm to create a 256-bit representation of the information. It is to be appreciated that other hash algorithms may be used, including other algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIPEMD-160. Other hash functions may include families based on Zémor-Tillich hash function and knapsack-based hash functions.

In further embodiments of the present disclosure, combinations including one or more of the above may be included in the metadata (M). Since the metadata (M) may be made public by way of the P2P distributed ledger 14 such as the blockchain, or transmitted over an unsecure network, it may be desirable that specific details of the metadata (M) be veiled or hidden for privacy reasons.

Therefore, the use of multi-signature P2SH Bitcoin transactions in embodiments of the present disclosure offers an advantage as it enables the transfer and permanent record of information associated with the computer software and the licence. This record is achieved by including the metadata in the output script of a transaction, for example, a redeem script.

First Redeem Script

As described above, a redeem script is an example of an output script in the standard P2SH method of the Bitcoin protocol and describes how a user may gain access to the cryptocurrency specified in the transaction record.

In the present disclosure the first redeem script (RS1) for the issuance token may be based on the metadata (M). The first redeem script (RS1) may further comprise an agent public key (PA) that forms a cryptographic pair with an agent private key (VA). In this way, the agent private key (VA) is required to "unlock" or spend cryptocurrency that is associated with the transaction.

In one example, the first redeem script (RS1) for the issuance token may include the metadata (M). The first redeem script (RS1) may further comprise an agent public key (PA). In this example, the first redeem script (RS1) may be of the form:

<OP_1 PA Metadata1 Metadata2 OP_3 OP_CHECK-MULTISIG> where OP_1 denotes the number of signatures required to satisfy the first redeem script (RS1) to unlock the transaction ("NumSigs"), and OP_3 denotes the number of public keys in the redeem script ("NumKeys").

In this example, the first redeem script (RS1) may comprise two designated fields for the metadata, Metadata1 and Metadata2. A specific example of the Metadata1 and Metadata2 is illustrated in Table 1 below.

TABLE 1

| Field | Sub-field | Bytes | Comments |
| --- | --- | --- | --- |
| Metadata1 | LicenceType | 4 | Coded value indicates type of licence. |
| | LicencePointer | 16 | IPv6 address identifying the DHT. |
| | LicenceTypeData1 | 12 | Format depends on value of LicenceType. Padded with zeros. |
| Metadata2 | LicenceHash | 20 | RIPEMD-160(SHA256(actual licence file addressed by LicencePointer)) |
| | LicenceTypeData2 | 12 | Format depends on value of LicenceType. Padded with zeros. |

This example includes providing a pointer to the licence in Metadata1 which may be useful where the size of the licence precludes including such details in the metadata (M). Furthermore, since the metadata (M) may be made public, or transmitted over an unsecure network, it may be desirable that specific details of the token be veiled or hidden for privacy reasons.

The first 4 bytes of Metadata1 indicates the type of licence. For example, the licence type may denote the name of the computer software such as BobSoftware. In a further example the licence type may denote the authorisation type of the licence, such as "single-user" or "multi-device" as described above. The next 16 bytes holds the IP address of the location of the actual electronic licence file, making allowance for IPv6 addresses. Note that in some embodiments, this value may point to the seed of a torrent file such that the licence file can be distributed over the cloud rather than being centralised. The following 12 bytes contains data specific to the type of licence.

The first 20 bytes of Metadata2 is a hash of the actual licence file using RIPEMD-160 over SHA256 applied to the actual contents of the licence file. As the actual licence file may be retrievable this allows validation of the transaction against the contract. Note that the licence file itself may be completely public (unencrypted and human readable) or may be encrypted for privacy, depending on the requirements of the specific embodiment. The content of the remaining 12 bytes of Metadata2 may be used depending on the type of licence.

It can be seen from the example of the first redeem script (RS1) provided above that the issuance token must be signed by the agent (A) in order to be spent. An example of the transaction for the issuance token is provided in Table 2, where for brevity the miner's fee is not shown.

TABLE 2

| ID-600 | Transaction-ID |
|---|---|
| Version number | Version number |
| 1 | Number of inputs |
| ID-110 | Prev Trans Output |
| IDX-00 | Prev Trans Output index |
| Script length | Script length |
| OP_0 Sig-VA < redeem script ID-110 > | ScriptSig |
| 0000 0000 0000 0001 | Sequence number |
| 1 | Number of outputs |
| C1 | Output value |
| Output script length | Output script length |
| OP_HASH160 < hash of redeem script (RS1) > OP_EQUAL | Output script |
| LockTime | LockTime |

Lines 4 to 8 of Table 2 represent the input to the transaction which is the first quantity of cryptocurrency (C1) that is to be included in the issuance token (i.e. "tokenised"). In this example, the first quantity of cryptocurrency (C1) was the result of a previous transaction (ID-110) that transferred the first quantity of cryptocurrency to the benefit of the agent (A), and therefore the previous transaction (ID-110) output script (redeem script ID-110) includes the agent's public key (PA). Accordingly, to unlock this previous output the script (redeem script ID-110) must be signed with the first user's private key (VA).

Lines 10 to 12 of Table 2 represent the first (and only) output of the transaction (ID-600), which in this case is representative of the issuance token being created and transferred back to the agent. Line 10 shows the output value, which is the first quantity of cryptocurrency (C1). Line 12 shows the output script, which includes a "<hash of redeem script>" as is used in the P2SH method of the Bitcoin protocol. In this example, the redeem script is the first redeem script (RS1) in the form as described above.

The output of the transaction (ID-600) shown in Table 2 is then recorded, with the first data output (O1), on the P2P distributed ledger 14. In particular, the first data output (O1) may comprise an indication of the first quantity of cryptocurrency (C1) that was transferred in the transaction. The first data output (O1) may further comprise a hash of the first redeem script (RS1).

In future transactions of the first quantity of cryptocurrency (C1), for example the transfer of the token to a first user 23 or second user 24, the script to unlock the first quantity of cryptocurrency (C1) (e.g. the input ScriptSig of the future transaction) may be in the form:

OP_0 Sig-VA Sig-VU1<OP_1 PA PU1 Metadata1 Metadata2 OP_4 OP_CHECKMULTISIG> where Sig-VU1 indicates the signature of the first user 23. Note that the above script assumes that only one signature from the agent (A) or the first user 23 is required to unlock the first quantity of cryptocurrency (C1).

The issuance token may be transferred to another user by way of a second redeem script (RS2).

Variations

Second Redeem Script

The token that is associated with the computer software and licence may be transferred from the agent (A) to another user, for example the first user 23 or second user 24. In one example, the transfer of the token may be representative as authorising access to the user for the computer software or licence. The transfer may be implemented by a second redeem script (RS2).

In one example, the agent (A) wishes to transfer the issuance token to a first user 23. The first user 23 may represent, for example, a vendor of the computer software.

In this example, the second redeem script (RS2) may be based on the metadata (M), the agent public key (PA) associated with the agent (A) and the first user public key (PU1) associated with the first user 23.

The second redeem script (RS2) may be of the form:

<OP_1 PA PU1 Metadata1 Metadata2 OP_4 OP_CHECKMULTISIG>

In this example, the second redeem script (RS2) comprises the same two metadata fields as the first redeem script (RS1). The second redeem script (RS2) further comprises the agent public key (PA) associated with the agent and the first user public key (PU1) associated with the first user.

It can be seen from the example of the second redeem script (RS2) provided above that the token that is transferred must be signed by the agent (A) or the first user 23 in order to be spent. An example of the transaction for this transfer of the issuance token is provided in Table 3, where again for brevity the miner's fee is not shown.

TABLE 3

| ID-610 | Transaction-ID |
|---|---|
| Version number | Version number |
| 1 | Number of inputs |
| ID-600 | Prev Trans Output |
| IDX-00 | Prev Trans Output index |
| Script length | Script length |
| OP_0 Sig-VA < OP_1 PA Metadata1 Metadata2 OP_3 OP_CHECKMULTISIG > | ScriptSig |
| 0000 0000 0000 0001 | Sequence number |
| 1 | Number of outputs |
| C1 | Output value |
| Output script length | Output script length |
| OP_HASH160 < hash of redeem script (RS2) > OP_EQUAL | Output script |
| LockTime | LockTime |

Similar to Table 2, lines 4 to 8 of Table 3 represent the input to the transaction (ID-610). In this example, the input is the issuance token, i.e. the output of the transaction (ID-600) that is illustrated in Table 2. It can be seen that the redeem script in line 7 corresponds to the redeem script of the issuance token, i.e. the first redeem script (RS1). Accordingly, to unlock the output of the transaction (ID-600) the first redeem script (RS1) must be signed with the agent's public key (PA).

Lines 10 to 12 of Table 3 represent the output of the transaction (ID-610), which in this case is representative of the issuance token being transferred to either the agent (A) or the first user 23 (U1). Line 10 shows the output value, which is the first quantity of cryptocurrency (C1). Line 12 shows the output script, which includes a "<hash of redeem script>" as is used in the P2SH method of the Bitcoin protocol. In this example, the redeem script is the second redeem script (RS2) in the form as described above.

The output of the transaction (ID-610) is then recorded, with a second data output (O2), on the P2P distributed ledger 14. The second data output (O2) may comprise an indication that the first quantity of cryptocurrency (C1) from the first data output (O1) is to be transferred in the transaction. The second data output (O2) may further comprise a hash of the second redeem script (RS2).

Identifier Indicative of the Location of the Computer Software or Licence

As described above the data (D1) or licence may comprise an identifier indicative of the location of the computer software or licence respectively.

In one example, the identifier may be determined independently to the data (D1) or the licence and remain separate to the data (D1) or licence. The identifier may further be assigned to the value of the key-value pair together with the data (D1) and the first hash value (H1) as described in the method 100 above. In this way, the identifier may be included in the value field of the message put(key, value) and sent to a participating node in the DHT 13, as described above.

In one example, the identifier indicative of the location may comprise a URL for an object on the Internet. In another example, the identifier indicative of the location may comprise an address for a repository such as a hash table or a DHT 13. In yet another example, the identifier indicative of the location may comprise an address for a computer-based repository such as a server, database or storage facility provided on a computer-based resource, such as the data store 17 associated with the first processing device 21 of the first node 3.

FIG. 6 illustrates a method 500 for determining location of the computer software or licence. The method 500 includes determining 510 the metadata (M) from the first redeem script (RS1). As described above, the metadata (M) may be embedded in one or more of the 15 places available for the public keys in the first redeem script (RS1).

In the P2SH method of the Bitcoin protocol, when the output of a transaction is spent in a subsequent transaction, the redeem script becomes visible in the subsequent transaction. As described above and with reference to Table 2, the transaction (ID-600) for the issuance token is paid back to the agent (A). In this way, the agent (A) may spend this issuance token to expose the first redeem script (RS1). The metadata (M) that is based on the second hash value (H2) is therefore visible on the P2P distributed ledger 14. In this way, the second hash value (H2) is able to be retrieved 520 from the metadata (M) in the first redeem script (RS1). In one example, the value associated with the key of the key-value pair is able to be retrieved from the DHT 13 using the request message get(key).

The method 500 further includes sending 530, over a communications network 5, the second hash value (H2) to a processor associated with a participating node of the DHT 13. As described above, the second hash value (H2) may be the key of the key-value pair. As also described above, the value for a given key may be retrieved by providing a message containing the key to any participating node of the DHT 13. Therefore, in the example where the identifier is included in the value field of the key-value pair, the method 500 is able to determine 540, from the processor of the participating node, the identifier indicative of the location of the computer software or licence.

Processing Device

As noted above, the first 3 and second node 7 may be an electronic device, such as a computer, tablet computer, mobile communication device, computer server etc. The electronic device may include a processing device 21, 27, a data store 17 and a user interface 15.

FIG. 7 illustrates an example of a processing device 21, 27. The processing device 21, 27 may be used at the first node 3, second node 7 or other nodes not otherwise illustrated. The processing device 21, 27 includes a processor 1510, a memory 1520 and an interface device 1540 that communicate with each other via a bus 1530. The memory 1520 stores a computer software program comprising machine-readable instructions and data for implementing the method 100 and 500 described above, and the processor 1510 performs the instructions from the memory 1520 to implement the method 100 and 500. The interface device 1540 may include a communications module that facilitates communication with the communications network 5, and in some examples, with the user interface 15 and peripherals such as data store 17. It should be noted that although the processing device 1510 may be an independent network element, the processing device 1510 may also be part of another network element. Further, some functions performed by the processing device 1510 may be distributed between multiple network elements. For example, the first node 3 may have multiple processing devices 21 to perform method 100, 500 in a secure local area network associated with the first node 3.

Where this disclosure describes that a user, employer, employee, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method (100) for authorizing access to computer software for a first user (U1), the method comprising:
 determining a data (D1) associated with the computer software, wherein the data (D1) comprises a licence associated with the computer software, and the licence is associated with the first user (U1) or a second user (U2) and further comprises a first user public key (PU1) associated with the first user (U1) or a second user public key (PU2) associated with the second user (U2);
 determining a first hash value (H1) of the computer software;
 determining a second hash value (H2) based on the data (D1) and the computer software;
 sending, over a communications network, the data (D1), the first hash value (H1) and the second hash value (H2) to an entry for storage in a distributed hash table as a key-value pair, wherein the second hash value (H2) is a key of a key-value pair and the data (D1) and the first hash value (H1) are a value in the key-value pair;
 determining a metadata (M) comprising the second hash value (H2) for storage on a peer-to-peer distributed ledger; and
 determining a second redeem script (RS2), wherein the second redeem script (RS2) is based on:
 the metadata (M),
 an agent public key (PA) associated with an agent (A), and
 the first user public key (PU1) associated with the first user (U1); and sending, over a second communications network, a second data output (O2) to the peer-to-peer distributed ledger based on:
an indication that a first quantity of cryptocurrency (C1) from a first data output (O1) is to be transferred, and
the second redeem script (RS2).

2. The method of claim 1, further comprising:
determining a first redeem script (RS1), wherein the first redeem script is based on:
the metadata (M); and
an agent public key (PA) associated with an agent (A).

3. The method of claim 2, further comprising:
sending, over the communications network, a first data output (O1) for storage on the peer-to-peer distributed ledger based on:
an indication of a first quantity of cryptocurrency (C1) to be transferred, wherein the first quantity of cryptocurrency (C1) is associated with the first redeem script (RS1); and
the first redeem script (RS1).

4. The method of claim 1 wherein the licence further comprises a hash value associated with at least one electronic device of the first user (U1) or the second user (U2).

5. The method of claim 1 wherein the licence further comprises the first hash value (H1).

6. The method of claim 1 wherein the licence comprises a top hash value of a Merkle tree.

7. The method of claim 1, further comprising:
determining an identifier indicative of a location of the computer software or the licence;
assigning the identifier to the value in the key-value pair; and
sending, over the communications network, the identifier to the entry on the distributed hash table.

8. The method of claim 1, further comprising:
determining an identifier indicative of a location of the computer software or the licence;
assigning the identifier to the value in the key-value pair;
sending, over the communications network, the identifier to the entry on the distributed hash table;
determining the metadata (M) from a first redeem script (RS1);
retrieving the second hash value (H2) from the metadata (M);
sending over the communications network, the second hash value (H2) to a processor associated with a participating node of the distributed hash table; and
determining, from the processor of the participating node, the identifier indicative of the location of the computer software or licence.

9. The method of claim 3 wherein the cryptocurrency is Bitcoin.

10. The method of claim 1 wherein the peer-to-peer distributed ledger is a blockchain.

11. A non-transitory computer readable medium comprising machine-readable instructions, that when executed by a processing device comprising a processor and memory, cause the processing device to:
determine a data (D1) associated with computer software, wherein the data (D1) comprises a licence associated with the computer software, and the licence is associated with a first user (U1) or a second user (U2) and further comprises a first user public key (PU1) associated with the first user (U1) or a second user public key (PU2) associated with the second user (U2);
determine a first hash value (H1) of the computer software;
determine a second hash value (H2) based on the data (D1) and the computer software;
send, over a communications network, the data (D1), the first hash value (H1) and the second hash value (H2) to an entry for storage in a distributed hash table as a key-value pair, wherein the second hash value (H2) is a key of a key-value pair and the data (D1) and the first hash value (H1) are a value in the key-value pair;
determine (150) a metadata (M) comprising the second hash value (H2) for storage on a peer-to-peer distributed ledger; and
determine a second redeem script (RS2), wherein the second redeem script (RS2) is based on:
the metadata (M),
an agent public key (PA) associated with an agent (A), and
the first user public key (PU1) associated with the first user (U1); and
sending, over a second communications network, a second data output (O2) to the peer-to-peer distributed ledger based on:
an indication that a first quantity of cryptocurrency (C1) from a first data output (O1) is to be transferred, and
the second redeem script (RS2).

12. A computer system operative authorize access to computer software for a first user (U1), the computer system comprising a computing device associated with a node, configured to:
determine a data (D1) associated with the computer software, wherein the data (D1) comprises a licence associated with the computer software, and the licence is associated with the first user (U1) or a second user (U2) and further comprises a first user public key (PU1) associated with the first user (U1) or a second user public key (PU2) associated with the second user (U2);
determine a first hash value (H1) of the computer software;
determine a second hash value (H2) based on the data (D1) and the computer software;
send, over a communications network, the data (D1), the first hash value (H1) and the second hash value (H2) to an entry for storage in a distributed hash table as a key-value pair, wherein the second hash value (H2) is a key of a key-value pair and the data (D1) and the first hash value (H1) are a value in the key-value pair;
determine a metadata (M) comprising the second hash value (H2) for storage on a peer-to-peer distributed ledger; and
determine a second redeem script (RS2), wherein the second redeem script (RS2) is based on:
the metadata (M),
an agent public key (PA) associated with an agent (A), and
the first user public key (PU1) associated with the first user (U1); and
sending, over a second communications network, a second data output (O2) to the peer-to-peer distributed ledger based on:
an indication that a first quantity of cryptocurrency (C1) from a first data output (O1) is to be transferred, and
the second redeem script (RS2).

* * * * *